United States Patent
Zhang et al.

(10) Patent No.: US 9,462,506 B2
(45) Date of Patent: Oct. 4, 2016

(54) METHOD AND DEVICE FOR ESTIMATING AVAILABLE CELL LOAD

(75) Inventors: Zhang Zhang, Beijing (CN); Mats Blomgren, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 302 days.

(21) Appl. No.: 14/001,492

(22) PCT Filed: Feb. 25, 2011

(86) PCT No.: PCT/SE2011/050217
§ 371 (c)(1),
(2), (4) Date: Aug. 23, 2013

(87) PCT Pub. No.: WO2012/115552
PCT Pub. Date: Aug. 30, 2012

(65) Prior Publication Data
US 2013/0329561 A1    Dec. 12, 2013

(51) Int. Cl.
*H04B 17/345*    (2015.01)
*H04B 17/382*    (2015.01)
(Continued)

(52) U.S. Cl.
CPC .......... *H04W 28/08* (2013.01); *H04B 17/345* (2015.01); *H04B 17/382* (2015.01); *H04W 24/08* (2013.01); *H04W 72/1252* (2013.01)

(58) Field of Classification Search
CPC ........................... H04B 17/345; H04W 28/08
See application file for complete search history.

(56) References Cited

U.S. PATENT DOCUMENTS

2006/0135173 A1    6/2006  Vannithamby
2009/0131098 A1*   5/2009  Khandekar .......... H04W 48/08
                                                 455/525

(Continued)

FOREIGN PATENT DOCUMENTS

WO    WO-2004025986 A2    3/2004
WO    WO-2008088257 A1    7/2008
WO    WO-2010151189 A1   12/2010

OTHER PUBLICATIONS

"3rd Generation Partnership Project; Technical Specification Group Radio Access Network; Radio Resource Control (RRC); Protocol specification", 3GPP TS 25.331 V10.1.0 (Sep. 2010), 1806 pages.

(Continued)

*Primary Examiner* — Jeffrey M Rutkowski
*Assistant Examiner* — Thomas D Busch
(74) *Attorney, Agent, or Firm* — Patents on Demand, P.A.; Brian K. Buchheit; Scott M. Garrett

(57) ABSTRACT

Methods and devices for determining an available load in a cell of a cellular radio system are provided where the determination of the available load is made in response to an estimated inter cell interference load. An estimated inter cell interference is determined. The inter cell interference change events are monitored by determining when a User Equipment changes serving cell or when the User Equipment adds or removes a cell to the active set of the User Equipment. The determined inter cell interference is adjusted by an estimated load caused by the User Equipment causing an inter cell interference change event, and the available load is determined in response to the adjusted inter cell interference. The method can continuously update inter cell interference. Moreover, the update can be made fast and thereby allow an improved estimation of the available cell load.

10 Claims, 4 Drawing Sheets

(51) Int. Cl.
*H04W 28/08* (2009.01)
*H04W 24/08* (2009.01)
*H04W 72/12* (2009.01)

(56) References Cited

U.S. PATENT DOCUMENTS

| | | | |
|---|---|---|---|
| 2009/0258651 A1* | 10/2009 | Sagfors | H04W 36/18 455/442 |
| 2009/0270109 A1* | 10/2009 | Wang Helmersson | H04W 52/367 455/453 |
| 2010/0008230 A1 | 1/2010 | Khandekar et al. | |
| 2010/0067389 A1* | 3/2010 | Wang Helmersson | H04W 52/343 370/252 |

OTHER PUBLICATIONS

"3rd Generation Partnership Project; Technical Specification Group Radio Access Network; UTRAN Iub interface Node B Application Part (NBAP) signalling", 3GPP TS 25.433 V10.0.0 (Sep. 2010), 1252 pages.

International Search Report, Application No. PCT/SE2011/050217, dated Nov. 14, 2011, 4 pages.

"International Preliminary Report on Patentability", Application No. PCT/SE2011/050217, 6 pages.

Gunnarsson, Fredrik, et al., "Uplink Admission Control in WCDMA Based on Relative Load Estimates", 2002, 5 pages, IEEE.

Holma, Harri, et al., "WCDMA for UMTS Radio Access for Third Generation Mobile Communications", 3rd Edition, 2004, 481 pages, John Wiley & Sons, Ltd.

* cited by examiner

METHOD AND DEVICE FOR ESTIMATING AVAILABLE CELL LOAD

CROSS-REFERENCE TO RELATED APPLICATIONS

This application is a National stage of International Application No. PCT/SE2011/050217, filed Feb. 25, 2011, which is hereby incorporated by reference.

TECHNICAL FIELD

The present invention relates to methods and devices for estimating available cell load in a cellular radio system.

BACKGROUND

Because the uplink in a Wideband Code Division Multiple Access (WCDMA) cellular radio system is non-orthogonal the so called near-far problem must be handled, i.e. a terminal close to the base station could easily drown the signal from a terminal at the cell border. To ensure the coverage of terminals at the cell border a limit is introduced on the total received power at the base station. A relative measure of total interference is rise over thermal (RoT) or noise rise, i.e. total interference relative to thermal noise, see Harri Holma, Antti Toskala, "WCDMA for UMTS—Radio Access For Third Generation Mobile Communications", third Edition.

The uplink total interference may come from both intra-cell interference and inter-cell interference. In order to be able to control the RoT a cell should estimate the level of inter-cell cell interference it is currently experiencing.

Load control is a functionality used for WCDMA uplink. Load control determines for each cell the maximum available load room that can be used by the scheduling function based on the uplink interference situation in that cell, see Harri Holma, Antti Toskala, "WCDMA for UMTS—Radio Access For Third Generation Mobile Communications", third Edition.

There are many different options to implement load control. Below two different exemplary implementations are described.

In a first example all the load which originates from users who are not served by one cell is treated (and estimated) in a single term called $L_{other}$, where $L_{other}$ is caused by the inter cell interference. The load available $L_{avail}$ for the scheduler of one in the cell is then calculated as:

$$L_{avail} = L_{max} - L_{other} \quad (1)$$

Where $L_{max}$ is the maximum allowed load in one cell, which is determined by the target (or maximum allowed) RoT in that cell. $L_{avail}$ is the load available for said cell (own cell available load room). The total load in the cell can be said to be $L_{avail}$ (if it is used) plus $L_{other}$, hence, this will be referred to as the two term approach.

In a second example the fact that transmissions stemming from User Equipments (UEs) who are not served but in soft handover (SHO) with said one cell are received and decoded by that cell is used. Since the transmission is received, the load of the transmission can be calculated. With this information the available load is calculated as:

$$L_{avail} = L_{max} - L_{SHO} - L_{other} \quad (2)$$

i.e. the available load is equal to the maximum load in that cell, minus the load stemming from UEs in SHO with that cell but have some other cell as serving cell ($L_{SHO}$), minus the load from all the other UEs ($L_{other}$), where $L_{other}$ is caused by the inter cell interference. This is referred to as the three term approach. Thus, in the three term approach the load caused by UEs in SHO are separated from the inter cell interference.

There is a desire for new methods and devices providing improved estimation of the available load for a cell in a cellular radio system, in particular a WCDMA system in order to improve the load scheduling in the cells of the cellular radio system.

SUMMARY

It is an object of the present invention to provide an improved methods and devices to address the problems as outlined above.

This object and others are obtained by the methods and devices as set out in the appended claims.

As has been realized by the inventors one property of inter-cell interference is that it is typically highly variable. As a consequence the estimation process of $L_{other}$ will typically require a high level of filtering. Such a filtering will make it difficult to adapt to abrupt changes in the inter-cell interference. As has been further realized by the inventors the filter will not be able to make a distinction between random changes (which should be filtered) and abrupt changes which would be beneficial to take into account when calculating the available load room and used when scheduling the load in the cell.

The problem (i.e. an abrupt change in inter-cell interference (or $L_{other}$)) has been discovered to arise when a user makes a serving cell change (referred to herein as case 1) or a cell is added into or removed from the active set of the user (referred to herein as case 2) and the load contribution of that UE should move between the different load terms. As has been realized this problem is especially critical if the user transmit with high data rate. This would potentially be a small problem if not for the slow estimation of $L_{other}$.

When a UE changes serving cell (case 1) the load from that UE which was prior incorporated in $L_{other}$ will suddenly be under the control of said cell and the current $L_{other}$ estimate will be an overestimation of the actual value. This will lead to that said cell would underestimate the available load room and, consequently, schedule bitrates that are lower than what is achievable under the given load constraints.

For case 1, when a UE leaves one cell (i.e. changes serving cell to another cell) there is also a problem. The true value of $L_{other}$ of said cell is instantly increased but the estimated value will require some time to converge to this new value. This results in an overestimation of the available resources with overload as a possible outcome. The overload may cause the coverage of the cell to shrink with possible dropped calls and failed access attempts as consequence.

For case 2, when a cell is added into active set of one user, the cell will be able to measure the load contribution of said user (part of $L_{SHO}$). However, since this load is still taken into account in the $L_{other}$ term the issue of underestimation arises also in this case.

Similarly, when a cell is removed from the active set (case 2) this may result in overestimation of the load in said cell. It will take some time before the $L_{other}$ estimation has been able to detect an actual change in the inter-cell interference and act accordingly.

In accordance with embodiments described herein methods and devices are provided that provide faster estimation and/or compensation for abrupt changes in inter-cell interference during serving cell change (case 1) or when a cell is added into or removed from the active set (case 2). This will in turn thus avoid (or at least reduce) either overestimation or underestimation of the available uplink resources in a cellular radio system.

In accordance with one embodiment a method of determining the available load in a cell of cellular radio system is provided where the determination of the available load is made in response to an estimated inter cell interference load. In accordance with the method an estimated inter cell interference is first determined. Then inter cell interference change events are monitored by determining when a User Equipment changes serving cell or when a User Equipment adds or removes a cell to the active set of the User Equipment. The determined inter cell interference is adjusted by an estimated load caused by the User Equipment causing an interference change event, and the available load is determined in response to the adjusted inter cell interference. The method can continuously update inter cell interference. Moreover, the update can be made fast and thereby allow an improved estimation of the available cell load.

In accordance with one embodiment the determined available load is used to schedule transmission in the uplink whereby an uplink transmission can be improved.

In accordance with one embodiment when a UE is changing serving cell (case 1), the target cell (i.e. the radio base station controlling the cell that will become the new serving cell) will reduce Lother according to the estimated load from said user in said target serving cell, and the serving cell (i.e. the radio base station controlling the serving cell) will increase Lother according to the estimated load from said user in said original serving cell. Note that the estimated load of said user is typically available in both cells (i.e. the radio base stations controlling the two cells) due to soft handover.

In case 2, a non-serving cell (i.e. the radio base station controlling a non-serving cell) which is removed from the active set of the UE will increase Lother according to the estimated load from said UE in said non-serving cell, and a non-serving cell which is added to the active set of said UE will decrease Lother according to the estimated load from said UE in said non-serving cell.

The invention also extends to and a radio base stations Node B arranged to perform the methods in accordance with the above. The radio base station Node B can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
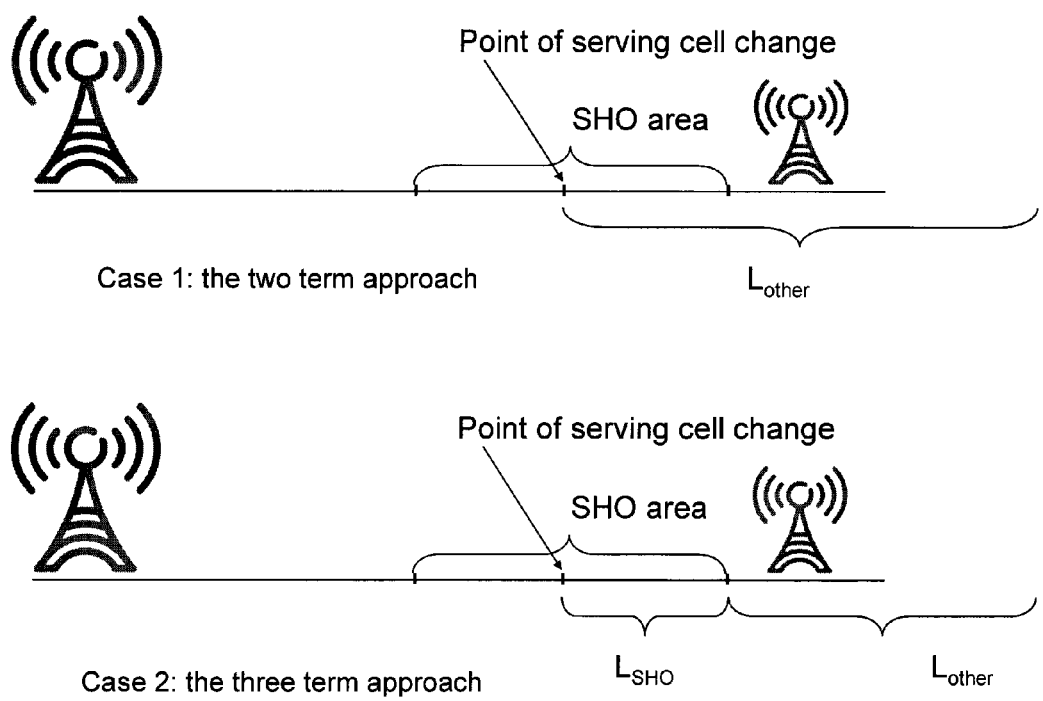
FIG. 1 illustrates some load scenarios.

The scenario when a user equipment makes a serving cell change (case 1) is depicted in FIG. 1. When a UE changes serving cell to one cell the load from that UE which was prior incorporated in $L_{other}$ will suddenly be under the control of said cell and the current $L_{other}$ estimate will be an overestimation of the actual value. This will lead to that said cell would underestimate the available load room and, consequently, schedule bitrates that are lower than what is achievable under the given load constraints.

When a UE leaves one cell (i.e. changes serving cell to another cell) there is also a problem. The true value of $L_{other}$ of said cell is instantly increased but the estimated value will require some time to converge to this new value. This results in an overestimation of the available resources with overload as a possible outcome. The overload may cause the coverage of the cell to shrink with possible dropped calls and failed access attempts as consequence.

The scenario when a cell is added into or removed from the active set of a user equipment (case 2) is also depicted in FIG. 1. When a cell is added into active set of one user, the cell will be able to measure the load contribution of said user (part of $L_{SHO}$) However, since this load is still taken into account in the $L_{other}$ term the issue of underestimation arises also in this case.

Similarly, when a cell is removed from the active set case 2 this may result in overestimation of the load in said cell. It will take some time before the $L_{other}$ estimation has been able to detect an actual change in the inter-cell interference and act accordingly.

Figure 2:
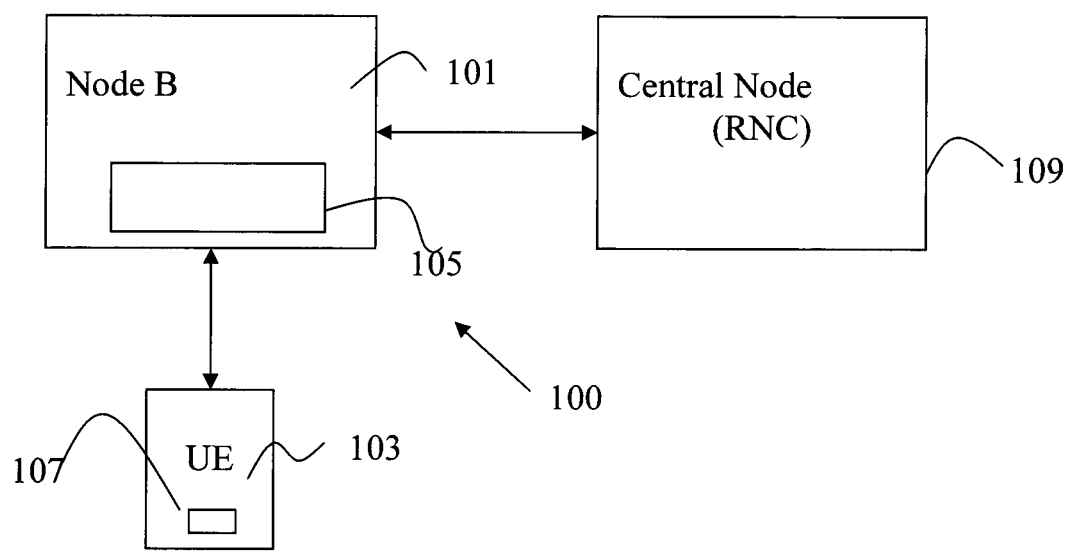
FIG. 2 is a view of a cellular radio system.

In FIG. 2 a general view of a cellular radio system 100 is depicted. The system 100 depicted in FIG. 1 is a UTRAN system. However it is also envisaged that the system can be an E-UTRAN system or another similar systems. The system 100 comprises a number of base stations, NodeB 101, whereof only one is shown for reasons of simplicity. Each radio base station is connected to a central control node 109. In particular the central control node can be a radio network controller (RNC) that controls a number of radio base stations 101. The base station 101 can be connected to by user equipments in the figure represented by the UE 103 located in the area served by the base station 101. The base station and the user equipment further comprise controllers/controller circuitry 105 and 107 for providing functionality associated with the respective entities. The controllers 105 and 107 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media. The controller 105 can in particular be adapted to estimate the available load to be scheduled for the cell controlled by the radio base station 101 and to schedule the load in accordance with the estimated available load. In particular the radio base station can be configured to perform the load estimation in accordance with the methods described herein.

Figure 3:
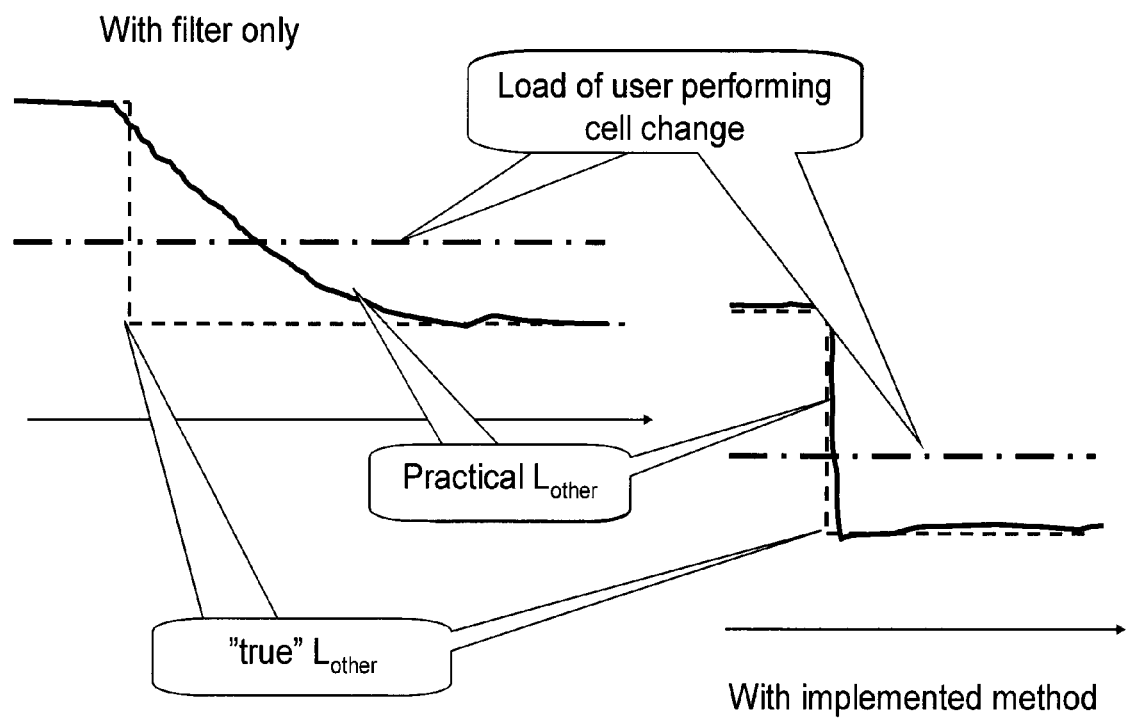
FIG. 3 is an illustration of the effects that can achieved for an exemplary embodiment of the invention.

In FIG. 3 the effects of an exemplary implementation of a method in accordance with the above has in the cell receiving coming-in serving cell change can be seen (for case 1). At the point of the serving cell change the "true" value of Lother will change abruptly as the cell that controls the load of the UE performing the serving cell change will change. There are two possible situations here, either the cell receiving serving cell change is already in the active set of the UE (which is typically the case as the cell is typically already in the active set of the UE for some time) and has therefore already knowledge of the load from the UE and can simply subtract this quantity from Lother. The other possibility is that the cell is not in the active set of the UE (which is not the typical case) in which case this load must first be estimated and then subtracted from Lother. Either way, this will typically be much faster than waiting for Lother to converge on its own.

The cell which used to be the serving cell will always have a measurement of the load of the UE available and can add this quantity to its estimated Lother value.

When a UE performs handover to said NodeB the "true" Lother value will drop in accordance with the load of that UE, the proposed solution allows for a faster adaptation.

For case 2 (the three-term approach) the proposed solution works in a similar fashion as depicted in FIG. 3, however the reduction/increase in the "true" Lother will not occur at serving cell change, it will instead occur when a cell is added to/removed from the active set of a UE, thus the proposed compensation should also be performed at that time point.

Figure 4:
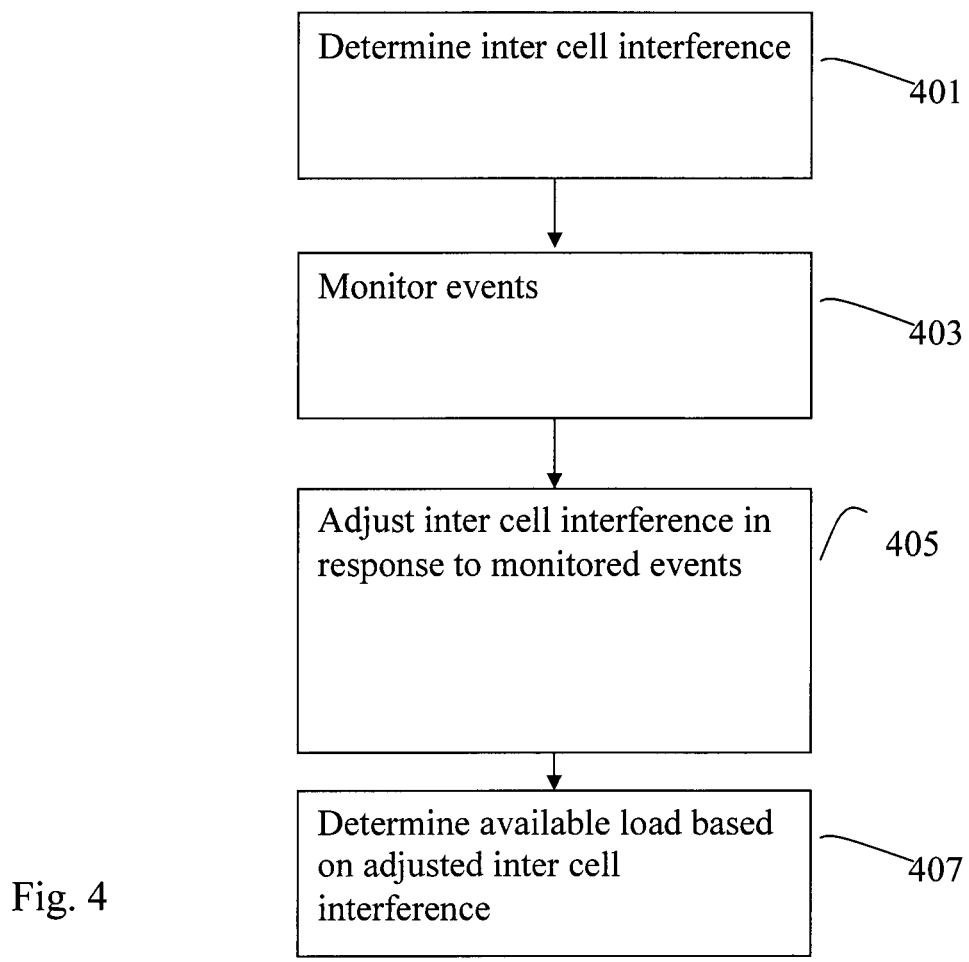
FIG. 4 is a flow chart depicting different steps performed when determining the available load in a cellular radio system.

In FIG. 4 a flow chart depicting different steps performed when determining the available load in a cellular radio system is depicted, and where determination of the available load is made in response to an estimated inter cell interference load is shown. First in a step 401 an estimated (initial) inter cell interference is determined. Then in a step 403 inter cell interference change events are monitored. The monitoring is performed by determining when a User Equipment changes serving cell or when a User Equipment adds or removes a cell to the active set of the User Equipment. The monitoring can be performed continuously and in real-time to enable fast correction of the estimated inter cell interference. Next, in a step 405, the determined inter cell interference is adjusted by an estimated load caused by the User Equipment causing an interference change event. The available load is the determined in response to the adjusted inter cell interference in a step 407. In accordance with one embodiment when a cell change occurs the above steps are only performed when a handover is performed in the same carrier. For the case of inter frequency handover there was no interference prior to the handover no action needs to be taken.

In accordance with one embodiment when the two term approach is adopted (case 1), suppose a UE is changing serving cell from cell A to cell B, and the load that the UE generates in cell A and cell B is loadA and loadB, respectively. The NodeBs that control cell A and cell B respectively can then be configured to update Lother for these two cells to compensate the abrupt inter-cell interference change as:

$$\text{LotherAnew} = \text{LotherAold} + \text{loadAest} \quad (3)$$

$$\text{LotherBnew} = \text{LotherBold} - \text{loadBest} \quad (4)$$

LoadAest and loadBest are load estimated by NodeBs that control cell A and cell B respectively.

The Lother updates can be triggered by Node-B Application Protocol (NBAP) signaling requesting the serving cell change, which is sent from RNC to the NodeBs.

LoadAest is typically always available in the NodeB that controls cell A when serving cell change is triggered. For LoadBest, this may not be the case if cell B is not in the active set of said UE (which is typically not the case). In this case NodeB that controls cell B needs to get LoadBest first after the serving cell change. This information can be obtained fast. For example the LoadBest can be based on Dedicated Physical Control Channel (DPCCH) Carrier-to-Interference Ratio (CIR) target and enhanced transport format combinations (E-TFC) read on enhanced DPCCH (E-DPCCH). Thus the update for LotherB needs to be delayed for a (predefined) very short time.

A special case is that cell A and cell B are controlled by the same NodeB (e.g. in a main remote radio system). In this case, even if cell B is not in the active set of said UE, loadAest and LoadBest are both available in said NodeB, and the NodeB can update Lother for both cell A and cell B once serving cell change is triggered. According to a second embodiment of the invention where the three term approach is adopted (case 2), suppose a cell is added into active set of one user. The NodeB that controls said cell update Lother for said cell to compensate the abrupt inter-cell interference change according to Eq. (4) above.

The Lother update can be performed a (predefined) very short time after the cell is added into the active set (the completion of active set addition can be known from NBAP signaling for active set addition). This is to make sure that the estimated load from the UE can be made available at the NodeB controls the cell before the update.

In case that (some of) the cells that are currently in the active set of the UE and the cell that is being added into the active set are controlled by the same NodeB (e.g. softer handover or in a main remote radio system). The Lother update can be performed when the active set addition is triggered by the corresponding NBAP signaling.

In case that a cell is removed from active set of one user, the NodeB that controls said cell update Lother for said cell to compensate the abrupt inter-cell interference change according to Eq. (3) above.

In this case the estimated load from the UE is always available at the NodeB that controls the cell, and the Lother update can be performed when the active set deletion is triggered by the corresponding NBAP signalling.

Using the methods and devices as described herein will provide efficient compensation for abrupt inter-cell interference change during serving cell change and/or soft handover. As a result harmful under- and over-estimations of the available own cell load can be avoided or at least reduced. Also a more stable uplink behaviour (less RoT oscillation) and better use of available uplink resources can be achieved.

The invention claimed is:

1. A method of determining an available load in a cell of a cellular radio system for load scheduling in cells of the cellular radio system, wherein the determination of the available load is made in response to an estimated inter cell interference load, the method comprising the steps of:
    determining an estimated inter cell interference;
    monitoring inter cell interference change events by determining when a User Equipment changes serving cell;
    adjusting the determined inter cell interference, wherein the inter cell interference in the serving cell of the User Equipment is increased by an estimated load in the serving cell caused by the User Equipment causing an inter cell interference change event, when the User Equipment changes the serving cell;

when the inter cell interference change event is caused by the User Equipment removing a cell from an active set of the User Equipment, decreasing the inter cell interference in the cell being removed from the active set of the User Equipment by the estimated load caused by the User Equipment;

when the inter cell interference change event is caused by the User Equipment changing serving cell, reducing the inter cell interference in the serving cell of the User Equipment by the estimated load caused by the User Equipment;

determining the available load in response to the adjusted inter cell interference; and load scheduling within the cellular radio system in accordance with the available load per the adjusted cell interference.

2. The method according to claim 1, wherein the determined available load is used to schedule transmission in an uplink.

3. The method according to claim 2, wherein the uplink is an uplink of a Wideband Code Division Multiple Access radio system.

4. The method according to claim 1, when the inter cell interference change event is caused by the User Equipment changing serving cell, the method further comprising increasing the inter cell interference in a target cell of the User Equipment by the estimated load caused by the User Equipment.

5. The method according to claim 1, when the inter cell interference change event is caused by the User Equipment removing a cell from an active set of the User Equipment, the method further comprising increasing the inter cell interference in the cell being removed from the active set of the User Equipment by the estimated load caused by the User Equipment.

6. A radio base station configured to determine an available load in a cell of a cellular radio system for load scheduling in cells of the cellular radio system, wherein the determination of the available load is made in response to an estimated inter cell interference load, the radio base station comprising:

a controller circuitry configured to determine an estimated inter cell interference;

the controller circuitry further configured to monitor inter cell interference change events by determining when a User Equipment changes serving cell;

the controller circuitry further configured to adjust the determined inter cell interference, wherein the inter cell interference in the serving cell is increased by an estimated load in the serving cell caused by the User Equipment causing an inter cell interference change event, when the User Equipment changes the serving cell;

the controller circuitry further configured to, when the inter cell interference change event is caused by the User Equipment removing a cell from an active set of the User Equipment, decrease the inter cell interference in the cell being removed from the active set of the User Equipment by the estimated load caused by the User Equipment;

the controller circuitry further configured to, when the inter cell interference change event is caused by the User Equipment changing serving cell, reduce the inter cell interference in the serving cell of the User Equipment by the estimated load caused by the User Equipment;

the controller circuitry further configured to determine the available load in response to the adjusted inter cell interference; and circuitry to load schedule within the cellular radio system in accordance with the available load per the adjusted cell interference.

7. The radio base station according to claim 6, wherein the radio base station is configured to use the determined available load to schedule transmission in an uplink.

8. The radio base station according to claim 7, wherein the radio base station is a radio base station for a Wideband Code Division Multiple Access radio system.

9. The radio base station according to claim 6, wherein the control circuitry is configured to, when the inter cell interference change event is caused by the User Equipment changing serving cell and the radio base station is controlling the target cell, increase the inter cell interference in a target cell of the User Equipment by the estimated load caused by the User Equipment.

10. The radio base station according to claim 6, wherein the control circuitry is configured to when the inter cell interference change event is caused by the User Equipment removing a cell from an active set of the User Equipment, increase the inter cell interference in the cell being removed from the active set of the User Equipment by the estimated load caused by the User Equipment.

* * * * *